United States Patent
Mimura et al.

(10) Patent No.: US 10,438,744 B2
(45) Date of Patent: Oct. 8, 2019

(54) NANOCRYSTAL FILM-COATED SUBSTRATE, MANUFACTURING METHOD OF SAME, AND MANUFACTURING METHOD OF BARIUM ZIRCONATE TITANATE NANOCRYSTAL

(71) Applicant: NATIONAL INSTITUTE OF ADVANCED INDUSTRIAL SCIENCE AND TECHNOLOGY, Tokyo (JP)

(72) Inventors: Ken-ichi Mimura, Owariasahi (JP); Kazumi Kato, Tokyo (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 177 days.

(21) Appl. No.: 15/442,953

(22) Filed: Feb. 27, 2017

(65) Prior Publication Data

US 2018/0247767 A1  Aug. 30, 2018

(51) Int. Cl.
| | |
|---|---|
| H01G 4/002 | (2006.01) |
| B05D 1/18 | (2006.01) |
| H01G 4/30 | (2006.01) |
| C04B 35/49 | (2006.01) |
| C04B 35/622 | (2006.01) |
| C01G 25/00 | (2006.01) |

(52) U.S. Cl.
CPC .............. *H01G 4/002* (2013.01); *B05D 1/18* (2013.01); *C01G 25/006* (2013.01); *C04B 35/49* (2013.01); *C04B 35/62222* (2013.01); *H01G 4/30* (2013.01); *C01P 2002/72* (2013.01); *C01P 2002/77* (2013.01); *C01P 2002/82* (2013.01); *C01P 2002/85* (2013.01); *C01P 2004/03* (2013.01); *C01P 2004/04* (2013.01); *C04B 2235/5454* (2013.01); *C04B 2235/6567* (2013.01); *C04B 2235/6583* (2013.01); *C04B 2235/781* (2013.01)

(58) Field of Classification Search
CPC ................................ C04B 35/49; B32B 18/00
See application file for complete search history.

(56) References Cited

U.S. PATENT DOCUMENTS

2013/0065065 A1  3/2013 Nakajima et al.

FOREIGN PATENT DOCUMENTS

| JP | A-02-502628 A | 8/1990 |
| JP | A-2005-162582 A | 6/2005 |
| WO | WO 2011/129341 A1 | 10/2011 |

OTHER PUBLICATIONS

"Spherical Nanocrystalline Barium Zirconate Titanate Prepared by Co-Precipitation in Highly Basic Aqueous Solution" authored by Seeharaj et al. and published in Ferroelectric, Section B: Process and Characterization (2013) 455, 1, 83-89.*
"Ba(ZrxTi1—x)O3 Thin Films for Tunable Microwave Applications" authored by Jinwoong et al. and published in Ceramics International (2015) 41, S323-S330.*
"Ethanol-Assisted Synthesis of Ba ZrxTi1—x)3 Ferroelectric Thin Film under Low Temperature Conditions" authored by Xu et al. and published in Crystal Growth and Design (2008) 8 (5), 1766-1769.*
"Surface Chemical States of Barium Zirconate Titanate Thin Films Prepared by Chemical Solution Deposition" authored by Jiang et al. and published in Applied Surface Science (2009) 255, 8913-8916.*
Abstract for "Sol-gel Synthesis of Nanoparticle and Films of BaTi1—xZrxO3" authored by Durilin et al. and published in Ukrainskii Khimicheskii Zhurnal (Russian Ed.) 2013, 79 (1), 7-12.*
Byeong Woo Lee et al., "Preparation of $BaZr_xTi_{1-x}O_3$ by the hydrothermal process from peroxo-precursors," Journal of the European Ceramic Society 25 (2005) 2009-2012.
S. Bhaskar Reddy et al., "Nanocrystalline barium zirconate titanate synthesized at low temperature by an aqueous co-precipitation technique," Scripta Materialia 57 (2007) 591-594.
Ken-ichi Mimura et at., "Synthesis and characterization of barium titanate-based solid solution nanocubes," Journal of the Ceramic Society of Japan 124(6) 639-643, 2016.
Ken-ichi Mimura et at., "Fabrication and electrical properties of barium titanate based solid solution nanocube assembly films," Japanese Journal of Applied Physics 55, 10TA05, 2016.
Ping Lu, et al., "Polarization Enhancement of Compositionally Graded $BaZr_xTi_{2-x}O_5$ Thin Films Prepared by Sol-Gel Method," Materials Letters, 2013, vol. 105, pp. 124-127.
Xiaoyong Chen, et al., "Synthesis and Morphology of $Ba(Zr_{0.20}Ti_{0.80})O_3$ Powders Obtained by Sol-Gel Method," Journal of Sol-Gel Science and Technology, United States, 2011, vol. 57, No. 2, pp. 149-156.

* cited by examiner

Primary Examiner — Marc S Zimmer
(74) Attorney, Agent, or Firm — Ostrolenk Faber LLP (57) ABSTRACT

A manufacturing method of a barium zirconate titanate nanocrystal is provided.
The manufacturing method of a barium zirconate titanate nanocrystal according to the present invention includes mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid and a solution is thereby obtained, and heating the solution and thereby performing synthesis.

17 Claims, 9 Drawing Sheets

NANOCRYSTAL FILM-COATED SUBSTRATE, MANUFACTURING METHOD OF SAME, AND MANUFACTURING METHOD OF BARIUM ZIRCONATE TITANATE NANOCRYSTAL

BACKGROUND OF THE INVENTION

Field of the Invention

The present invention relates to a nanocrystal film-coated substrate, a manufacturing method of the same, and a manufacturing method of a barium zirconate titanate nanocrystal.

Description of Related Art

Barium titanate ($BaTiO_3$) is known as a ferroelectric material. Barium titanate is used in a multilayer capacitor and the like because of high relative permittivity. Regarding barium zirconate titanate ($Ba(Zr,Ti)O_3$) which is a solid solution of barium titanate ($BaTiO_3$) and barium zirconate ($BaZrO_3$), the followings are reported. In particular, in a composition in which a ratio of zirconium:titanium is in the vicinity of 20:80, integration, that is, pinching of phase transition temperatures (rhombohedron phase→orthorhombus phase→tetragon phase→cube phase) of barium titanate causes temperature dependency of permittivity to be smoothed and causes the maximum value thereof to be shown in the vicinity of room temperature.

Size reduction, capacity enlargement, and high reliability of a multilayer capacitor are progressing with recent miniaturization of electronic devices. In such a situation, there are various requirements for forms and particle diameters of dielectric particles to be used. A barium zirconate titanate nanocrystal is a very interesting material in a point that the barium zirconate titanate nanocrystal has monodispersity, is fine, and has a controlled hexahedral structure. In addition, it is possible to expect improvement of reliability for an operating temperature of a device and to expect an increase of permittivity in the vicinity of room temperature.

Regrading barium zirconate titanate, synthesis examples using methods such as a sintering method, a sonochemical method, a hydrothermal method, a coprecipitation method, or a sol-gel method are reported. For example, in the article of Non-Patent Literature 1, a method in which nanocrystals of barium zirconate titanate (Zr:Ti=20:80) are synthesized under a hydrothermal condition of a temperature of 130° C. by using a peroxo-hydroxide precursor is reported. In the article of Non-Patent Literature 2, a method in which nanocrystals of barium zirconate titanate (10 mol % to 30 mol % which is the substituted Zr content) are synthesized by a coprecipitation method is reported.

CITATION LIST

Non-Patent Literature

[NPL 1] Byeong Woo Lee, Seung-Beom Cho, Journal of the European Ceramic Society 25 (2005) 2009-2012.

[NPL 2] S. Bhaskar Reddy, K. Prasad Rao and M. S. Ramachandra Rao, Scripta Materialia 57 (2007) 591-594

SUMMARY OF THE INVENTION

However, controlling the form and the particle diameter of a barium zirconate titanate nanocrystal has hardly been reported.

Considering the above circumstances, an object of the present invention is to provide a nanocrystal film-coated substrate, a manufacturing method of the same, and a manufacturing method of a barium zirconate titanate nanocrystal.

The inventor performed close examination for achieving the above object. As a result, the inventor found that a solution was obtained by mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid, and the solution was heated and thereby performing synthesis, and thus a barium zirconate titanate nanocrystal which had monodispersity, was fine, and had a hexahedral structure was obtained, and finished the present invention.

According to an aspect of the present invention, there is provided a nanocrystal film-coated substrate which includes a substrate and a nanocrystal film in which barium zirconate titanate nanocrystals are arranged on the substrate.

In the nanocrystal film-coated substrate, barium zirconate titanate in the barium zirconate titanate nanocrystal may be represented by a general formula $BaZr_xTi_{1-x}O_3$ ($0<x\leq0.5$).

In the nanocrystal film-coated substrate, the barium zirconate titanate nanocrystal may have a hexahedral shape and a size of 10 nm to 50 nm.

The nanocrystal film-coated substrate may have at least one peak in a range of 310 $cm^{-1}$ to 240 $cm^{-1}$ in a Raman spectroscopy spectrum.

In the nanocrystal film-coated substrate, an average of absolute values of saturation values of piezoelectric constants $d_{33\text{-}PFM}$ obtained by measurement of a piezoresponse force microscope may be 15 pm/V to 200 pm/V.

In the nanocrystal film-coated substrate, an absolute value of a coercive electric field may be 0.1 kV/cm or more and less than 142 kV/cm.

In the nanocrystal film-coated substrate, heat treatment may be performed on the nanocrystal film-coated substrate and thereby interface bonding between the barium zirconate titanate nanocrystals is formed.

In the nanocrystal film-coated substrate, the substrate may be selected from the group consisting of fluorine doped tin oxide (FTO), indium tin oxide (ITO), glass, silicon, metal, ceramics, polymer, paper, rubber, and a low heat-resistant base material.

According to another aspect of the present invention, there is provided a manufacturing method of a barium zirconate titanate nanocrystal, which includes mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid and thereby a solution is obtained, and heating the solution and thereby performing synthesis.

In the manufacturing method of a barium zirconate titanate nanocrystal, a ligand of the water-soluble titanium complex may be hydroxycarboxylic acid.

In the manufacturing method of a barium zirconate titanate nanocrystal, a ligand of the water-soluble zirconium complex is hydroxycarboxylic acid.

In the manufacturing method of a barium zirconate titanate nanocrystal, the amine compound may be tert-butylamine, and the organic carboxylic acid may be oleic acid.

In the manufacturing method of a barium zirconate titanate nanocrystal, concentration of sodium hydroxide in the solution may be 1 mol/L to 2 mol/L.

In the manufacturing method of a barium zirconate titanate nanocrystal, a molar ratio of titanium/zirconium in the solution may be 0.01:0.99 to 0.99:0.01.

In the manufacturing method of a barium zirconate titanate nanocrystal, in the solution, the number of moles of the amine compound with respect to 1 mol of barium may be 2 to 16, and the number of moles of the organic carboxylic acid with respect to 1 mol of barium may be 2 to 16.

In the manufacturing method of a barium zirconate titanate nanocrystal, the heating may be performed at a temperature of 150° C. to 240° C. for a period of one hour to 120 hours.

In the manufacturing method of a barium zirconate titanate nanocrystal, after the synthesis, centrifugation of the solution may be performed and a precipitate is thereby collected.

According to still another aspect of the present invention, there is provided a manufacturing method of a nanocrystal film-coated substrate, which includes a process of dispersing barium zirconate titanate nanocrystals manufactured by using the manufacturing method of a barium zirconate titanate nanocrystal, in a nonpolar solvent, a process of performing centrifugation of a nanocrystal dispersion liquid and collecting a supernatant and a nanocrystal dispersion liquid is thereby obtained, and a process of immersing a substrate into the nanocrystal dispersion liquid in a half-closed state, and pulling the substrate up from the nanocrystal dispersion liquid and barium zirconate titanate nanocrystals are thereby arranged on the substrate.

According to the nanocrystal film-coated substrate of the present invention, it is possible to provide a nanocrystal film-coated substrate in which barium zirconate titanate nanocrystals having a controlled shape are arranged on a substrate.

According to the manufacturing method of a barium zirconate titanate nanocrystal of the present invention, it is possible to manufacture a barium zirconate titanate nanocrystal having a controlled shape.

BRIEF DESCRIPTION OF THE DRAWINGS

FIGS. 11A, 11B and 11C show results obtained by performing XPS measurement on the nanocrystal produced in Example 1 by using an X-ray photoelectron spectrometer; in particular, FIG. 11A shows a result for Ba 3d, FIG. 11B shows a result for Ti 2p, and FIG. 11C shows a result for Zr 3d.

DETAILED DESCRIPTION OF THE INVENTION

Hereinafter, a nanocrystal film-coated substrate, a manufacturing method of the same, and a manufacturing method of a barium zirconate titanate nanocrystal, which are one embodiment to which the present invention is applied, will be described in detail.

Nanocrystal Film-Coated Substrate

A nanocrystal film-coated substrate according to the embodiment of the present invention includes a substrate and a nanocrystal film in which barium zirconate titanate nanocrystals are arranged on the substrate.

In this specification, "a nanocrystal" refers to a hexahedral crystal (so-called nanocube) which has a nanoscale size and includes an incomplete hexahedral crystal which has a nanoscale size, has beveled vertices of a hexahedron, and is generated simultaneously in a process of synthesizing or producing a nanocube. The incomplete hexahedral crystal having in which beveled vertices of a hexahedron is an intermediate for a hexahedral crystal. The size thereof is not limited if the size is a nanometer size which allows barium zirconate titanate to have a hexahedral shape. For example, the size thereof is about 1 to 40 nm. The above-described size means the length of the longest side when each nanocrystal is viewed in a plan view.

In this specification, "barium zirconate titanate" is represented by a general formula $Ba(Zr_xTi_{1-x})O_3$ ($0<x\le1$). Thus, a case of $x=1$, that is, a case of barium zirconate is also included.

As the substrate, a substrate which is stable in a solvent and have no hygroscopicity can be applied. A substrate having a flat surface is preferable. For example, a substrate selected from the group consisting of FTO, ITO, glass, silicon, metal, ceramics, polymer, paper, rubber, and a low heat-resistant base material can be used.

A composition of a barium zirconate titanate (general formula of $BaZr_xTi_{1-x}O_3$) nanocrystal constituting a nanocrystal film in the nanocrystal film-coated substrate of the present invention preferably satisfies $0<x\leq0.5$, more preferably satisfies $0.1\leq x\leq0.5$, further preferably satisfies $0.1\leq x\leq0.3$, and most preferably satisfies $0.1\leq x\leq0.2$.

In the nanocrystal film-coated substrate according to the present invention, it is preferable that the barium zirconate titanate nanocrystal has a hexahedral shape and a size of 10 nm to 50 nm.

Here, it is preferable that 80% or more of barium zirconate titanate nanocrystals constituting the nanocrystal film have a size of 10 nm to 50 nm, and it is more preferable that 90% or more thereof have a size of 10 nm to 50 nm.

The nanocrystal film-coated substrate according to the present invention preferably has at least one peak in a range of 310 cm$^{-1}$ to 240 cm$^{-1}$ and more preferably has at least one peak in a range of 305 cm$^{-1}$ to 250 cm$^{-1}$, in a Raman spectroscopy spectrum. A peak in the vicinity of 305 cm$^{-1}$ is a peak belonging to a tetragon, and a crystal structure becomes a cubic structure as the amount of a solid solution of Zr is increased. Thus, peaks are integrated to be a broad peak in the vicinity of 285 cm$^{-1}$. This case corresponds to a case where barium zirconate titanate (general formula of $Ba(Zr_xTi_{1-x})O_3$) constituting the nanocrystal film satisfies $0<x\leq0.2$.

In the nanocrystal film-coated substrate according to the present invention, an average of absolute values of saturation values of piezoelectric constants $d_{33-PFM}$ obtained by measurement of a piezoresponse force microscope is preferably 15 pm/V to 200 pm/V.

In the nanocrystal film-coated substrate according to the present invention, an absolute value of a coercive electric field is preferably 0.1 kV/cm or more and less than 142 kV/cm.

In the nanocrystal film-coated substrate according to the present invention, it is preferable that heat treatment is performed on the nanocrystal film-coated substrate, and thus interface bonding between barium zirconate titanate nanocrystals is formed.

Manufacturing Method of Barium Zirconate Titanate Nanocrystal

A manufacturing method of a barium zirconate titanate nanocrystal according to the present invention includes mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid and a solution is thereby obtained, and heating the solution and thereby performing synthesis.

Here, when "the solution is obtained by mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid", a method of the mixing is not particularly limited. For example, the above-described substances may be mixed at the same time, may be individually mixed, and some thereof may be mixed earlier. Specifically, for example, a mixed solution of the aqueous solution of the water-soluble titanium complex and the aqueous solution of the water-soluble zirconium complex may be obtained, and then, this mixed solution may be mixed with others.

In a case of manufacturing barium zirconate (case of x=1), the manufacturing method according to the present invention includes mixing a barium hydroxide aqueous solution, an aqueous solution of a water-soluble zirconium complex, a sodium hydroxide aqueous solution, an amine compound, and organic carboxylic acid and thereby a solution was obtained, and heating the solution and synthesis was thereby performed.

The molar ratio (barium:zirconium:titanium) of barium included in the barium hydroxide aqueous solution, zirconium included in the aqueous solution of the water-soluble zirconium complex, and titanium included in the aqueous solution of the water-soluble titanium complex (the above solutions are used in the present invention) is preferably in a range of (1:0.01:0.99) to (1:0.99:0.01), and more preferably in a range of (1:0.01:0.99) to (1:0.3:0.7). The molar ratio is preferably in a range of (1:0.1:0.9) to (1:0.3:0.7) in a viewpoint that nanocrystals are arranged more flat on the substrate so as to have two dimensions. The molar ratio is preferably in a range of (1:0.4:0.6) to (1:0.6:0.4) in a viewpoint that nanocrystals are caused to grow up to about 100 nm.

As the water-soluble titanium complex used in the present invention, for example, a compound in which a ligand are left from a titanium atom after the compound is dissolved in water, and the titanium atom and an oxygen atom are bonded can be used. As such a compound, a compound in which a ligand of a water-soluble titanium complex is hydroxycarboxylic acid is preferable. Specifically, examples of hydroxycarboxylic acid can include lactic acid, malic acid, citric acid, tartaric acid, glyceric acid, 2-hydroxybutyric acid, leucic acid (=2-hydroxy-4-methylpentanoic acid), quinic acid, mandelic acid (=2-hydroxy-2-phenylacetic acid), and glycolic acid. Examples of the water-soluble titanium complex include Titanium bis(ammonium lactate) dihydroxide (hereinafter "TALH") having lactic acid as a ligand, $(NH_4)_6[Ti_4(C_2H_2O_3)_4(C_2H_3O_3)_2(O_2)_4O_2].6H_2O$ having glycolic acid ($HOCH_2COOH$) as a ligand, $(NH_4)_8[Ti_4(C_6H_4O_7)_4(O_2)_4].8H_2O$ having citric acid $((CH_2COOH)_2C(OH)COOH)$ as a ligand, and a titanium complex having malic acid $(CH_2CHOH(COOH)_2)$ or tartaric acid $((CHOH)_2(COOH)_2)$ as a ligand.

According to the manufacturing method of a barium zirconate titanate nanocrystal used in the present invention, it is possible to synthesize a barium zirconate titanate nanocrystal having a controlled hexahedral structure, by using a water-soluble titanium complex which has hydroxycarboxylic acid as a ligand.

As the water-soluble zirconium complex used in the present invention, for example, a compound in which a ligand is left from a zirconium atom after the compound is dissolved in water, and the zirconium atom and an oxygen atom are bonded can be used. As such a compound, a compound in which a ligand of a water-soluble zirconium complex is hydroxycarboxylic acid is preferable. Specifically, examples of hydroxycarboxylic acid can include lactic acid, malic acid, citric acid, tartaric acid, glyceric acid, 2-hydroxybutyric acid, leucic acid (=2-hydroxy-4-methylpentanoic acid), quinic acid, mandelic acid (=2-hydroxy-2-phenylacetic acid), and glycolic acid. Examples of the water-soluble zirconium complex include a zirconium lactate ammonium salt.

According to the manufacturing method of a barium zirconate titanate nanocrystal used in the present invention, it is possible to synthesize a barium zirconate titanate nanocrystal having a controlled hexahedral structure, by using a water-soluble zirconium complex which has hydroxycarboxylic acid as a ligand.

As the amine compound used in the present invention, a compound in which an unshared electron pair of a nitrogen atom can contribute to a reaction can be used. Examples of such a compound include tert-butylamine or n-butylamine. In particular, tert-butylamine is preferably used.

As the organic carboxylic acid used in the present invention, a compound which is coordinated with a (100) plane of a nanocrystal during the synthesis of nanocrystals, and thus can suppress crystal growth in the (100) plane of the nanocrystal can be used. As such a compound, oleic acid is exemplified. However, if a compound is carboxylic acid having a long carbon chain, such as decanoic acid (capric acid) ($CH_3(CH_2)_8COOH$), the compound which does not have a double bond may also be used.

According to the manufacturing method of a barium zirconate titanate nanocrystal according to the present invention, it is possible to synthesize a barium zirconate titanate nanocrystal having a controlled hexahedral structure, by using tert-butylamine as the amine compound and using oleic acid as the organic carboxylic acid.

pH of a reaction solution used in the present invention is adjusted by adding a sodium hydroxide aqueous solution. The amount of the sodium hydroxide aqueous solution to be added is preferably determined to cause the concentration of sodium hydroxide in the obtained reaction solution to be 1 mol/L to 2 mol/L, and more preferably determined to cause the concentration thereof to be 1.5 mol/L.

In a case where the concentration thereof is less than 1 mol/L, there is a problem in that a synthesis reaction does not sufficiently proceed. In a case where the concentration thereof is more than 2 mol/L, there is a problem that aggregation of nanocrystals is easily caused.

Here, the sodium hydroxide (NaOH) aqueous solution is added as a pH regulator. Ammonia which is used well as a pH regulator in hydrothermal synthesis does not cause a sufficient strong base condition which causes synthesis to easily proceed (a stronger base is not obtained even though ammonia is further added in a condition of pH 14). However, if sodium hydroxide (NaOH) is used, the sufficient strong base condition is made, and thus synthesis of barium zirconate titanate nanocrystals easily proceeds.

According to the manufacturing method of a barium zirconate titanate nanocrystal of the present invention, the concentration of sodium hydroxide in a solution obtained by mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid is 1 mol/L to 2 mol/L. Thus, it is possible to cause a synthesis reaction to sufficiently proceed and to sufficiently suppress aggregation of nanocrystals.

In the solution in the present invention, it is preferable that the number of moles of the amine compound with respect to 1 mol of barium is 2 to 16, and the number of moles of the organic carboxylic acid with respect to 1 mol of barium is 2 to 16.

In other words, a molar ratio of barium, the amine compound, and the organic carboxylic acid which are included in the solution in the present invention is preferably in a range of 1:2:2 to 1:16:16.

In a case where the number of moles of the amine compound with respect to 1 mol of barium is less than 2, there is a problem in that the synthesis reaction does not sufficiently proceed. In a case where the number of moles of the organic carboxylic acid with respect to 1 mol of barium is less than 2, there is a problem that the shape of a nanocrystal is not sufficiently controlled and a clear hexahedron is not formed. Further, in a case where the number of moles of the amine compound with respect to 1 mol of barium is more than 16, and/or in a case where the number of moles of the organic carboxylic acid with respect to 1 mol of barium is more than 16, there is a problem in that it is difficult to completely remove the amine compound and the organic carboxylic acid after the synthesis reaction is ended.

According to the manufacturing method of a barium zirconate titanate nanocrystal of the present invention, in the solution obtained by mixing a barium hydroxide aqueous solution, an aqueous solution of a water-soluble titanium complex, a sodium hydroxide aqueous solution, an amine compound, and organic carboxylic acid, the number of moles of the amine compound with respect to 1 mol of barium is 2 to 16, and the number of moles of the organic carboxylic acid with respect to 1 mol of barium is 2 to 16. Thus, the synthesis reaction sufficiently proceeds, the shape of a nanocrystal is appropriately controlled, and a situation in which the amount of the substance which is to be removed after the synthesis reaction is ended is excessively increased does not occur.

At the beginning of growth, the barium zirconate titanate nanocrystals have a regular octahedron surrounded by (111) planes which has the smallest surface energy. A state of a shape in which six (100) planes as the maximum, in which vertices of an octahedron are beveled are provided along with the (111) plane occurs at an intermediate stage for forming an octahedral nanocrystal. At this time, the (100) plane has surface energy larger than that of the (111) plane. Thus, molecules of organic carboxylic acid such as oleic acid adhere to the (100) plane easier than the (111) plane. Thus, when barium zirconate titanate nanocrystals are synthesized, crystal growth proceeds in a state where organic carboxylic acid such as oleic acid adheres to the (100) plane. As a result, crystal growth in the (100) plane proceeds with difficultly, but crystal growth in the (111) plane proceeds without being disturbed by organic carboxylic acid molecules. Thus, growth in all of eight (111) planes proceeds, and vertices are formed. Thus, a complete hexahedral nanocrystal having a cubic shape as a whole is easily formed.

If the amount of the organic carboxylic acid is large, crystal growth in the (111) plane is also suppressed. If the number of moles of the amine compound is set to be equal to or more than the number of moles of the organic carboxylic acid, the shape of a nanocrystal to be generated approaches a complete hexahedron.

The reaction solution used in the present invention is preferably heated at a temperature of 150° C. to 240° C., and is more preferably heated at a temperature of 200° C. to 230° C. In a case where a heating temperature is lower than 150° C., there is a problem in that a synthesis reaction does not sufficiently proceed. In a case where the heating temperature is higher than 240° C., there is a problem in that organic carboxylic acid which has been coordinated with the surface of a nanocrystal is desorbed during a reaction, or the organic carboxylic acid is separated in a reaction solution, and thus, finally, the controlled hexahedral structure is not obtained.

The reaction solution used in the present invention is preferably heated for a period of one hour to 120 hours, and more preferably heated for a period of 70 hours to 100 hours. In a case where a heating period is less than one hour, there is a problem in that a synthesis reaction does not sufficiently proceed. Since the shape of a nanocrystal is hardly changed even though the heating period is longer than 120 hours, it is considered that heating is not required for a period of 120 hours or longer.

When the reaction proceeds by heating the reaction solution in the present invention, various known methods can be appropriately used. Hydrothermal synthesis is preferably used.

According to the manufacturing method of a barium zirconate titanate nanocrystal in the present invention, heating is performed at a temperature of 150° C. to 240° C. for a period of one hour to 120 hours, and thus it is possible to cause the synthesis reaction to sufficiently proceed, and to obtain the controlled hexahedral structure without performing excessive heating.

In the present invention, it is preferable that, after synthesis, centrifugation of the solution is performed and a precipitate is collected.

According to the manufacturing method of a barium zirconate titanate nanocrystal in the present invention, the solution after synthesis is subjected to centrifugation and a precipitate is collected. Thus, it is possible to remove unnecessary small crystals and the like, and to obtain a nanocrystal having the controlled hexahedral structure.

According to the manufacturing method of a barium zirconate titanate nanocrystal according to the present invention, it is possible to synthesize a barium zirconate titanate nanocrystal which has monodispersity, is fine, and has a controlled hexahedral structure. The barium zirconate titanate nanocrystal manufactured in this manner has a determined size and a determined shape, and thus can form, for example, a structure body integrated so as to provide two-dimensional or three-dimensional arrangement on a substrate. Thus, application to a device having new performance or a new function is expected. The barium zirconate titanate nanocrystal is fine, and thus can correspond to miniaturization of an electronic device. Further, a nanocube manufactured by the manufacturing method in this application easily performs self-arrangement.

Manufacturing Method of Nanocrystal Film-Coated Substrate

A nanocrystal film-coated substrate according to the present invention can be manufactured, for example, in a manner that powder of barium zirconate titanate nanocrystals is dispersed in a nonpolar solvent by performing ultrasonic treatment on the nonpolar solvent for about 1 to 10 minutes, centrifugation is performed, a supernatant (nanocrystal dispersion liquid) thereof is collected, and a substrate is immersed in a nanocrystal dispersion liquid.

At this time, it is preferable that the substrate and the nanocrystal dispersion liquid are put into a box made of quartz glass, and a pulling-up operation is performed in a half-closed state. Thus, it is possible to suppress volatilization of a solvent during coating, and to constantly maintain a pulling rate, and thus it is possible to manufacture a nanocrystal film-coated substrate in which nanocrystals are disposed more regularly. The pulling rate may be about 10 to 50 nm/sec.

Further, firing may be performed on the obtained nanocrystal film-coated substrate, for example, at a temperature of 800° C. to 900° C. for about 1 to 24 hours.

With performing the firing, it is possible to obtain an effect of largely improving electrical characteristics by interface bonding.

EXAMPLES

Synthesis and Identification of Barium Zirconate Titanate Nanocrystal (1) Synthesis (Manufacturing) of Barium Zirconate Titanate (Ba:Zr:Ti=1:0.2:0.8, Described as BZT, Below, x Indicates a Composition of Zr) Nanocrystal A barium zirconate titanate nanocrystal was synthesized in accordance with the following procedures (Example 1).

3 mmol of barium hydroxide was dissolved in 22.8 ml of water. A mixed solution of 0.576 ml of a TALH aqueous solution and 1.085 ml of an aqueous solution of a zirconium lactate ammonium salt (manufactured by Matsumoto Fine Chemical Co., LTd., ZC-300 (product name)) was added to a barium hydroxide aqueous solution with stirring. Then, 7.2 ml of a sodium hydroxide aqueous solution having a concentration of 5 mol/L, 1.92 ml of tert-butylamine, and 5.7 ml of oleic acid were added, thereby a reaction solution is prepared. The concentration of sodium hydroxide in the obtained reaction solution was 1.2 mol/L and a molar ratio (barium:tert-butylamine:oleic acid) of barium, tert-butylamine, and oleic acid was 1:12:12. The solution prepared in this manner was put into an autoclave and the autoclave was closed. The autoclave was heated at a temperature of 220° C. for 72 hours, and then was cooled to room temperature. Then, centrifugation (5800 rpm, for 5 minutes) was performed on a solution including a reaction product, and a precipitate was collected. As a centrifuge, H9RH model manufactured by Kokusan Co., Ltd was used.

Barium zirconate titanate in Examples 2 to 6 was synthesized by using a method in which a molar ratio of a titanium complex and a zirconium complex, a heating temperature (synthesis temperature) at a time of synthesis, and a heating period (synthesis period) are set to conditions shown in Table 1, and others are similar to those in Example 1. Descriptions as Example 1 (Zr:Ti=20:80), Example 2 (Zr:Ti=15:85), Example 3 (Zr:Ti=10:90), Example 4 (Zr:Ti=5:95), Example 5 (Zr:Ti=50:50), and Example 6 (Zr:Ti=100:0) will be made below.

Table 1 shows synthesis conditions for Examples 1 to 6.

TABLE 1

| | Ba concentration (mol/L) | Ba:Zr:Ti molar ratio | NaOH concentration (mol/L) | Synthesis temperature (° C.) | Synthesis period (hours) |
|---|---|---|---|---|---|
| Example 1 | 0.1 | 1:0.2:0.8 | 1.2 | 220 | 72 |
| Example 2 | 0.1 | 1:0.15:0.85 | 1.2 | 230 | 96 |
| Example 3 | 0.1 | 1:0.1:0.9 | 1.2 | 230 | 96 |
| Example 4 | 0.1 | 1:0.05:0.95 | 1.2 | 230 | 96 |
| Example 5 | 0.1 | 1:0.5:0.5 | 1.2 | 230 | 96 |
| Example 6 | 0.1 | 1:1:0 | 1.2 | 220 | 96 |

(2) Identification of Barium Zirconate Titanate Nanocrystal

Regarding a barium zirconate titanate nanocrystal, a SEM image was obtained by using a scanning electron microscope (manufactured by JEOL Corporation, JSM-6335FM, 10 kV), and a HR-TEM image, a BF-STEM image, and a HAADF-STEM image were obtained by using a high-resolution transmission microscope (manufactured by Hitachi, Ltd., Hitachi H-9000UHR III). A crystal phase was identified by using an X-ray diffraction device (manufactured by Rigaku Corporation, SmartLab, 40 kV/30 mA) and a lattice constant was calculated from the result of the identification. Binding energy of each element and a Ba:Ti:Zr composition ratio were identified by an X-ray photoelectron spectrometer (manufactured by Shimadzu Corporation, ESCA-3400).

Various identification samples of barium zirconate titanate nanocrystals were produced in a manner that a colloidal solution in which powder collected by centrifugation was redispersed in toluene was dropped on a silicon wafer substrate and was dried at room temperature. The sample was irradiated with ultraviolet light for 2 hours, and then was held at 200° C. in an incubator for 1.5 hours and thereby purification of a surface is performed.

Figure 1:
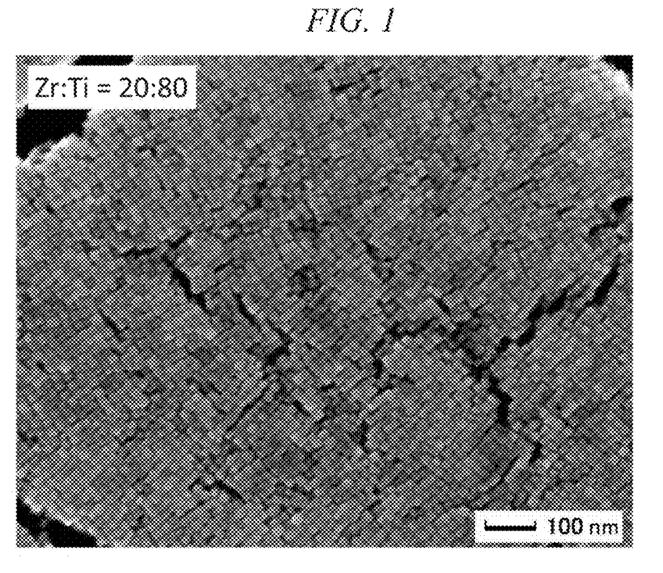
FIG. 1 is a SEM image of a surface of a sample in which barium zirconate titanate nanocrystals (Zr:Ti=20:80) produced in Example 1 are arranged on a substrate.
Figure 2A:
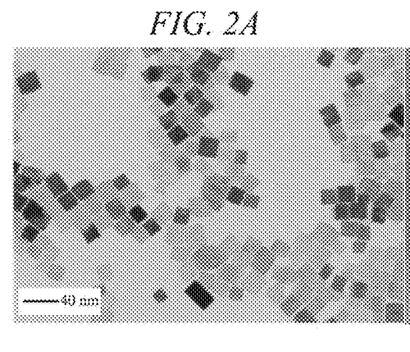
FIG. 2A is a HR-TEM image in a state where a dispersion liquid of barium zirconate titanate nanocrystals (Zr:Ti=20:80) used in Example 1 is dropped onto a grid.
Figure 2B:
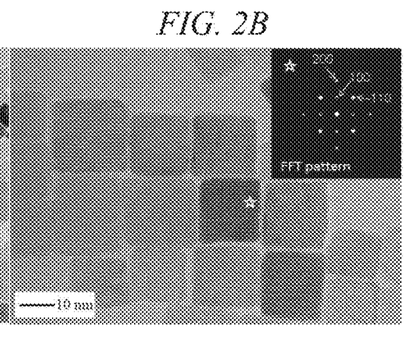
FIG. 2B is a HR-TEM image obtained by further enlarging FIG. 2A, and a FFT pattern.

FIG. 1 shows a SEM image of a surface of a sample in which barium zirconate titanate nanocrystals (Zr:Ti=20:80) produced in Example 1 are arranged on a silicon wafer substrate by the above sample producing method. FIG. 2A shows a HR-TEM image obtained by enlarging a region having low density of barium zirconate titanate nanocrystals in the sample shown in the SEM image in FIG. 1. FIG. 2B shows a HR-TEM image obtained by further performing enlargement, and a FFT pattern of one barium zirconate titanate nanocrystal in the HR-TEM image.

It could be confirmed that, in Example 1, nanocrystals having a substantially hexahedron and a size of about 15 to 20 nm could be synthesized, from the SEM image. The size and distribution of nanocrystals depended on the synthesis conditions. However, in Example 1, nanocrystals having a size of 15 to 20 nm corresponded to about 90% of the entirety.

Nanocrystals synthesized in Example 1 were two-dimensionally arranged on the substrate with a gap hardly provided.

The synthesized nanocrystals had a FFT pattern which was the same as a single crystal.

Figure 3A:
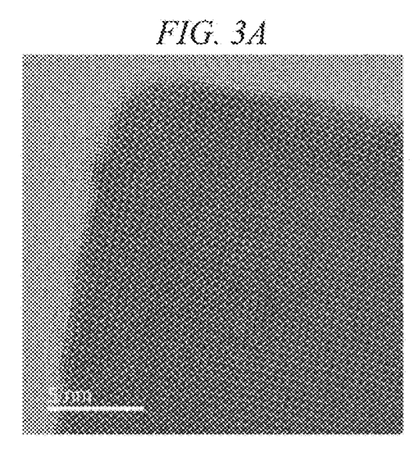
FIG. 3A is a BF-STEM image of one nanocrystal of the sample used in Example 1.
Figure 3B:
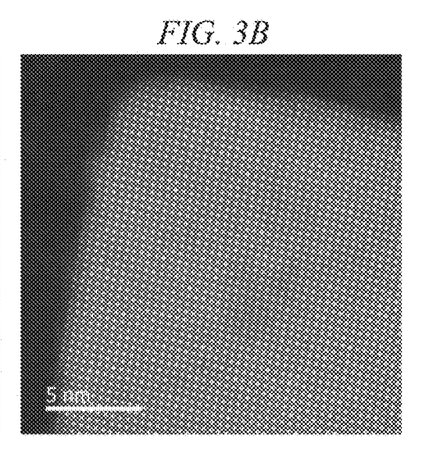
FIG. 3B is a HAADF-STEM image of one nanocrystal of the sample in Example 1.

FIG. 3A shows a BF (Bright Field)-STEM image of one nanocrystal in the sample produced in Example 1. FIG. 3B shows a HAADF (High-angle Annular Dark Field)-STEM image.

Here, the BF-STEM image corresponds to a case where an image is formed only by using transmitted electrons. In a case where an image is formed only by using scattered electrons, a DF (Dark Field)-STEM image is used. An image obtained in a manner that scattered electrons having a higher angle than those in DF-STEM are detected in an annular detector is a HAADF-STEM image. In a contrast image obtained by HAADF-STEM, an intensity difference obtained by squaring an atom number of Z is obtained.

From FIGS. 3(a) and 3(b), it was understood that the obtained nanocrystals had no defects and the crystallinity was significantly high.

Figure 4:
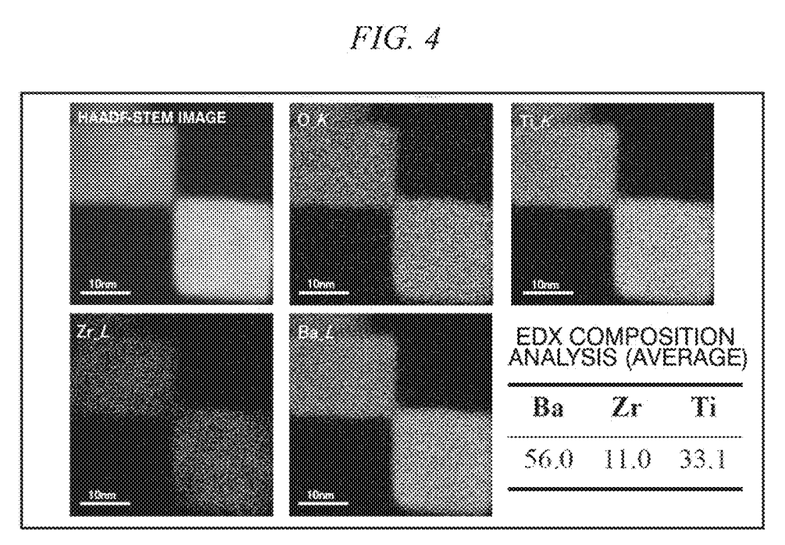
FIG. 4 shows a result obtained by performing STEM-EDX mapping on the sample used in Example 1.

FIG. 4 shows a result obtained by performing STEM-EDX mapping on the sample in Example 1. STEM-EDX mapping was performed by using JEOL JEM-ARM200F Dual-X and JED-2300 (manufactured by JEOL Corporation). A HAADF-STEM image, a distribution image of oxygen atoms, and a distribution image of titanium atoms are provided in an order of the right image from the left image on the top. A distribution image of zirconium atoms and a distribution image of barium atoms are provided in an order of the right image from the left image in the bottom.

It is understood that all of the elements are uniformly distributed in a nanocrystal.

The lower right table shows a result (average) obtained by composition analysis of EDX. Since Ba-L and Ti-K overlap each other, it is difficult to perform complete separation.

Figure 5:
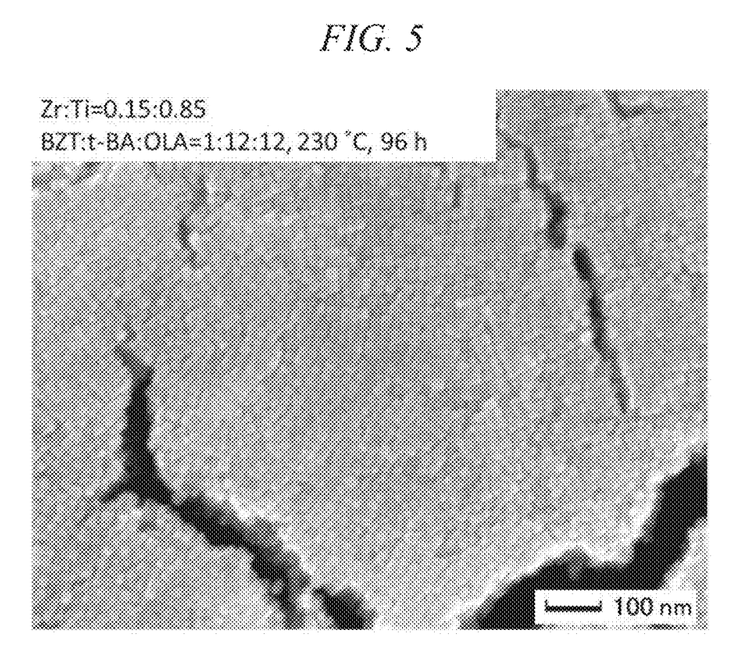
FIG. 5 is a SEM image of a surface of a sample in which barium zirconate titanate nanocrystals (Zr:Ti=15:85) produced in Example 2 are arranged on a substrate.

FIG. 5 shows a SEM image of a surface of a sample in which barium zirconate titanate nanocrystals (Zr:Ti=15:85) produced in Example 2 are arranged on a silicon wafer substrate.

It could be confirmed that, in Example 2, nanocrystals having a substantially hexahedron and a size of about 15 to 20 nm could be synthesized, from the SEM image. The size and distribution of nanocrystals depended on the synthesis conditions. However, in Example 2, nanocrystals having a size of 15 to 20 nm corresponded to about 90% of the entirety.

Nanocrystals synthesized in Example 2 were two-dimensionally arranged on the substrate with a gap hardly provided.

Figure 6:
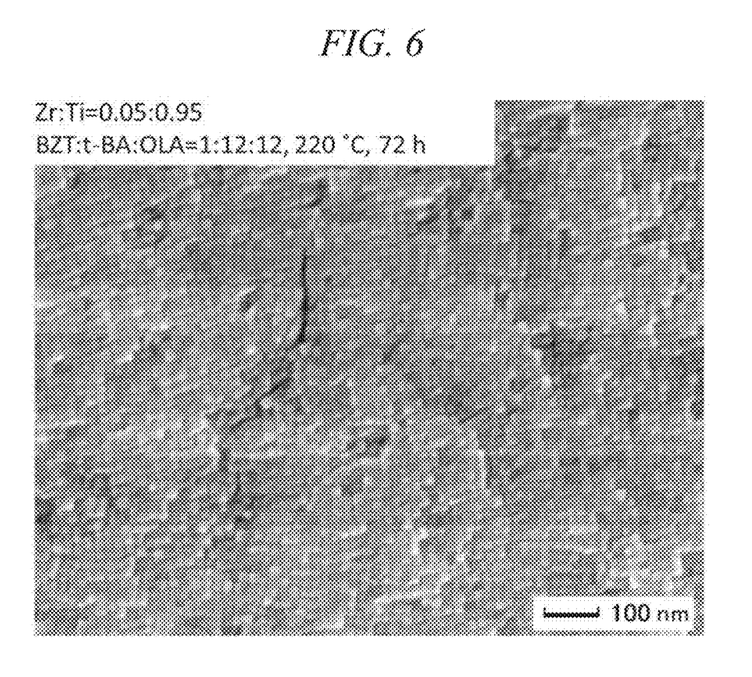
FIG. 6 is a SEM image of a surface of a sample in which barium zirconate titanate nanocrystals (Zr:Ti=5:95) produced in Example 4 are arranged on a substrate.

FIG. 6 shows a SEM image of a surface of a sample in which barium zirconate titanate nanocrystals (Zr:Ti=5:95) produced in Example 4 are arranged on a silicon wafer substrate.

It could be confirmed that, in Example 4, nanocrystals having a substantially hexahedron and a size of about 15 to 20 nm could be synthesized, from the SEM image. The size and distribution of nanocrystals depended on the synthesis conditions. However, in Example 4, nanocrystals having a size of 15 to 20 nm corresponded to about 90% of the entirety.

Nanocrystals synthesized in Example 4 were two-dimensionally arranged on the substrate with a gap hardly provided.

Figure 7:
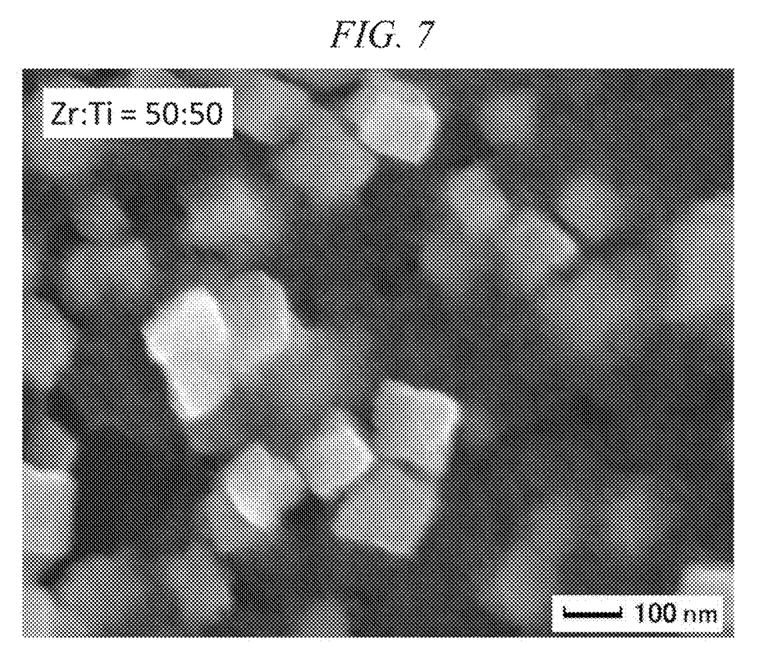
FIG. 7 is a SEM image of a surface of a sample in which barium zirconate titanate nanocrystals (Zr:Ti=50:50) produced in Example 5 are arranged on a substrate.

FIG. 7 shows a SEM image of a surface of a sample in which barium zirconate titanate nanocrystals (Zr:Ti=50:50) produced in Example 5 are arranged on a silicon wafer substrate by the above sample producing method.

It could be confirmed that, in Example 5, nanocrystals in which the hexahedral shape was collapsed in comparison to that in FIG. 1, but which had a substantially hexahedron and a size of about 15 to 20 nm could be synthesized, from the SEM image. The size and distribution of nanocrystals depended on the synthesis conditions. However, in Example 2, nanocrystals having a size of 15 to 20 nm corresponded to about 90% of the entirety.

Nanocrystals synthesized in Example 5 were aggregated with a cubic shape of about 100 nm.

Figure 8:
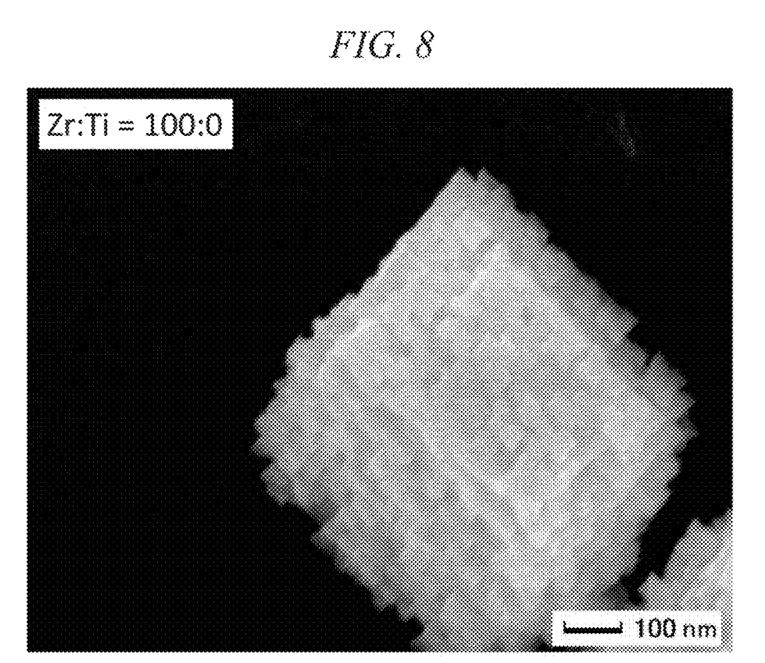
FIG. 8 is a SEM image of a surface of a sample in which barium zirconate nanocrystals (Zr:Ti=100:0) produced in Example 6 are arranged on a substrate.

FIG. 8 shows a SEM image of a surface of a sample in which barium zirconate nanocrystals (Zr:Ti=100:0) produced in Example 6 are arranged on a silicon wafer substrate by the above sample producing method.

It could be confirmed that, in Example 6, nanocrystals having a substantially hexahedron and a size of about 20 to 40 nm could be synthesized, from the SEM image. The size and distribution of nanocrystals depended on the synthesis conditions. However, in Example 6, nanocrystals having a size of 20 to 40 nm corresponded to about 90% of the entirety.

Nanocrystals synthesized in Example 6 were aggregated to have an island shape.

Figure 9:
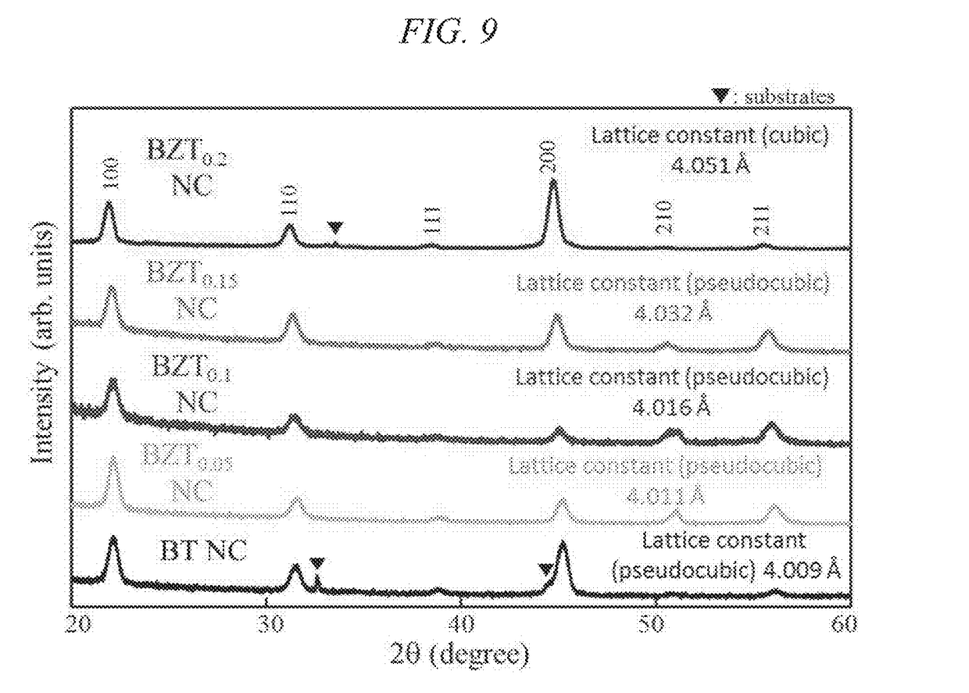
FIG. 9 shows a result obtained by performing powder XRD measurement on the nanocrystal ($BZT_{0.2}$ in FIG. 9) produced in Example 1, the nanocrystal ($BZT_{0.15}$ in FIG. 9) produced in Example 2, the nanocrystal ($BZT_{0.1}$ in FIG. 9) produced in Example 3, the nanocrystal ($BZT_{0.05}$ in FIG. 9) produced in Example 4, and a barium titanate nanocrystal (Zr:Ti=0:100) (BT in FIG. 9) by using an X-ray diffraction device.

FIG. 9 shows a result obtained by performing powder XRD measurement on the nanocrystal ($BZT_{0.2}$ in FIG. 9) produced in Example 1, the nanocrystal ($BZT_{0.15}$ in FIG. 9) produced in Example 2, the nanocrystal ($BZT_{0.1}$ in FIG. 9) produced in Example 3, the nanocrystal ($BZT_{0.05}$ in FIG. 9)

produced in Example 4, and a barium titanate nanocrystal (Zr:Ti=0:100) (BT in FIG. 9) by using an X-ray diffraction device.

Figure 10:
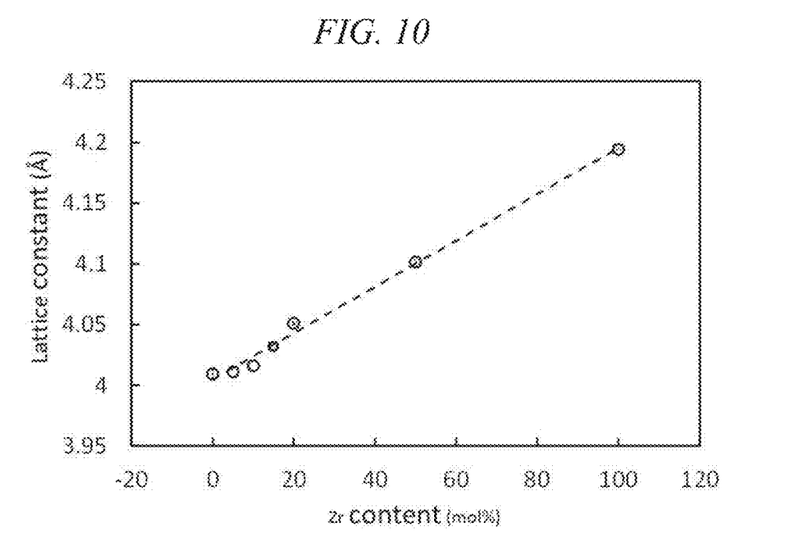
FIG. 10 is a graph obtained by plotting a lattice constant of the nanocrystal, which is obtained by powder XRD measurement, with respect to the amount of zirconium.

FIG. 10 shows a graph obtained by plotting a lattice constant of the nanocrystal, which is obtained by powder XRD measurement, with respect to the amount of zirconium.

Zr=0 (mol %) corresponds to a barium titanate nanocrystal. Zr=5 (mol %) corresponds to a nanocrystal produced in Example 4. Zr=10 (mol %) corresponds to a nanocrystal produced in Example 3. Zr=15 (mol %) corresponds to a nanocrystal produced in Example 2. Zr=20 (mol %) corresponds to a nanocrystal produced in Example 1. Zr=50 (mol %) corresponds to a nanocrystal produced in Example 5. Zr=100 (mol %) corresponds to a nanocrystal produced in Example 6.

Figure 11A:
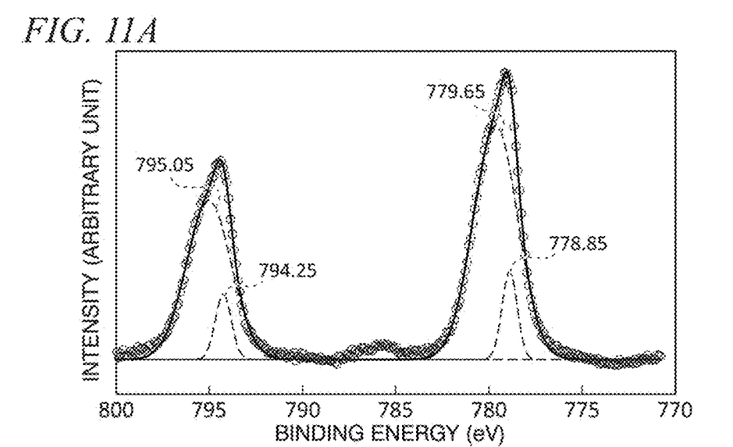
Figure 11B:
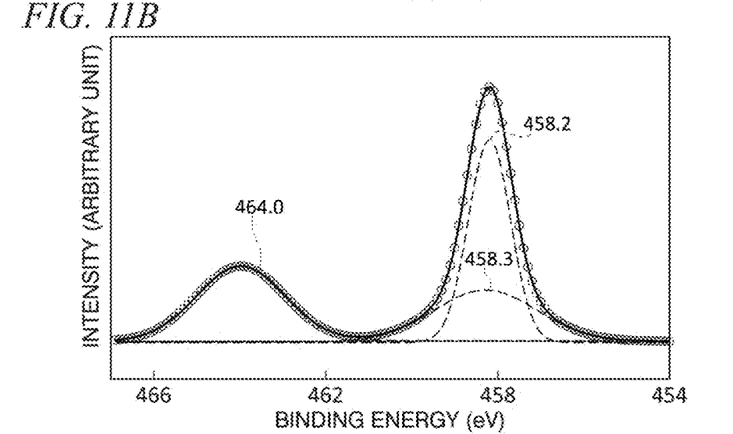
Figure 11C:
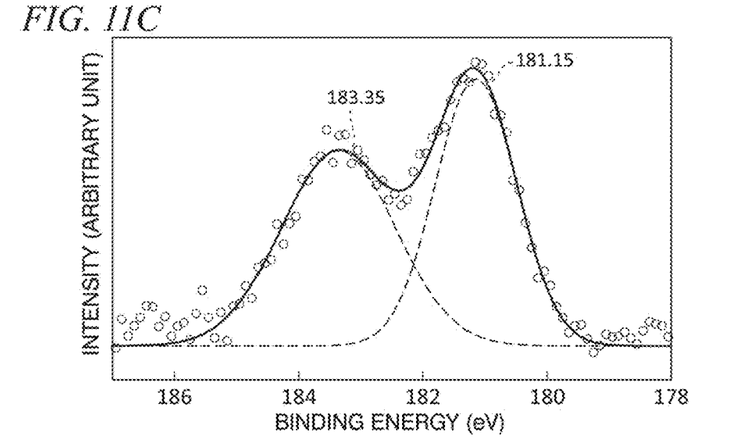

FIGS. 11A, 11B and 11C results obtained by performing XPS measurement on the nanocrystal produced in Example 1 by using an X-ray photoelectron spectrometer; FIG. 11A shows a result for Ba 3d, FIG. 11B shows a result for Ti 2p, and FIG. 11C shows a result for Zr 3d.

Table 2 shows a Ba:Ti:Zr composition ratio of the nanocrystal produced in Example 1. The Ba:Ti:Zr composition ratio has been obtained from the XPS measurement results. A value approximate to a defined composition (Ba:Ti:Zr=50:40:10) was obtained.

TABLE 2

| Element | Amount (mol %) |
|---------|----------------|
| Ba | 51.49 |
| Ti | 40.86 |
| Zr | 7.65 |

Producing of Nanocrystal Film-Coated Substrate

Firstly, an operation as follows was repeated twice. Ethanol was added to a precipitate (including a barium zirconate titanate (Zr:Ti=20:80) nanocrystal in Example 1) obtained by the above synthesis and collection method and ultrasonic treatment was performed for 1 to 10 minutes. Then, centrifugation (5800 rpm, for 5 minutes) was performed again and a precipitate was collected. This corresponds to washing treatment for removing a raw material which does not react, an extra surfactant, or the like.

The obtained precipitate was dried, and then redispersion was performed by performing ultrasonic treatment on toluene for 1 to 10 minutes. The solution was subjected to centrifugation (5800 rpm, for 15 minutes), and then a supernatant was collected. Further, centrifugation (5800 rpm, for 45 minutes) was performed on the supernatant and a precipitate was collected. Thus, powder of barium zirconate titanate (Zr:Ti=20:80) nanocrystals was obtained. 0.1 g of powder of barium zirconate titanate (Zr:Ti=20:80) nanocrystals and 20 ml of mesitylene (nonpolar solvent) were put into a container. Ultrasonic treatment was performed for 5 minutes, and thereby performing re-dispersion (acceleration of dispersion of crystals). The solution was further subjected to centrifugation (5800 rpm, for 5 minutes), and a supernatant was collected. This solution was set as a nanocrystal dispersion liquid for producing an integrated body. This operation has a purpose for causing the size and dispersity of nanocrystals to be uniform, and is a technique suitable for separating and collecting nanocrystals of a predetermined size (for example, 15 to 20 nm).

15 ml of the obtained nanocrystal dispersion liquid were put into a cylindrical bottle, and a platinum-coated silicon substrate (Pt/TiO$_2$/SiO$_2$/Si) was vertically immersed. Then, the substrate was pulled up at a rate of 20 nm/sec, and thus an integrated body in which nanocrystals were three-dimensionally arranged with regularity was obtained. At this time, an operation in which the substrate and the dispersion liquid were put into a box made of quartz glass and the substrate was pulled up was performed in order to suppress volatilization of a solvent during coating and to constantly maintain the pulling rate.

The obtained integrated body was irradiated with ultraviolet light for 2 hours, and then, was held at 200° C. in an incubator for 1.5 hours and thereby performing purification of a surface. Then, prefiring was performed at 400° C. for 1 hour in an oxygen flow in a box type electric furnace, and firing treatment was performed at 850° C. for 1 hour. Thus, a nanocrystal film-coated substrate was obtained.

Figure 12A:
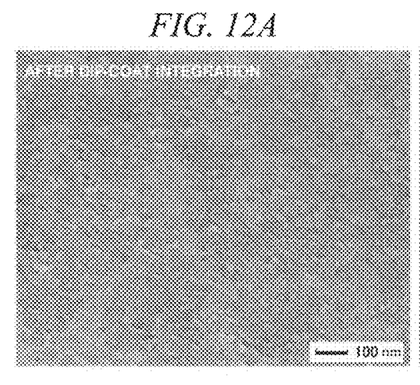
FIG. 12A is a SEM image of a surface of a nanocrystal film-coated substrate of barium zirconate titanate (Zr:Ti=20:80) before firing.

FIG. 12A shows an electron microscopic (SEM) image of a surface of a barium zirconate titanate nanocrystal film-coated substrate produced by using the barium zirconate titanate (Zr:Ti=20:80) nanocrystals in Example 1, before firing. It is understood that nanocrystals are arranged with a gap hardly provided.

Figure 12B:
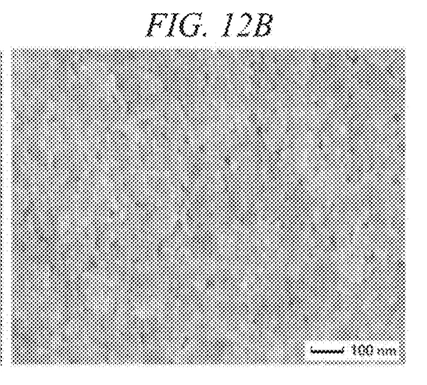
FIG. 12B is a SEM image of the nanocrystal film-coated substrate after firing.

FIG. 12B shows an electron microscopic (SEM) image of a surface of the barium zirconate titanate nanocrystal film-coated substrate after firing. If the SEM image is enlarged, it is understood that nanocrystals are arranged with a gap hardly provided and nanocrystals which are adjacent to each other are bonded.

Regarding the barium zirconate titanate (Zr:Ti=10:90) nanocrystal in Example 3, a barium zirconate titanate nanocrystal film-coated substrate was produced in a manner similar to that in the above descriptions, and then, firing treatment was performed in the same conditions. That is, a nanocrystal film-coated substrate was obtained by performing a method similar to that in a case of Example 1 on the above nanocrystals except that the nanocrystals were obtained in Example 3. Then, a firing treatment was performed.

Figure 13A:
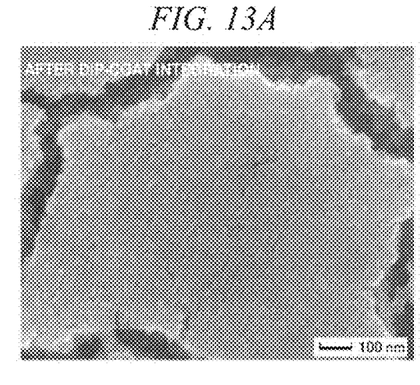
FIG. 13A is a SEM image of a surface of a nanocrystal film-coated substrate of barium zirconate titanate (Zr:Ti=10:90) before firing.

FIG. 13A shows an electron microscopic (SEM) image of a surface of a barium zirconate titanate nanocrystal film-coated substrate produced by using the barium zirconate titanate (Zr:Ti=10:90) nanocrystals in Example 3, before firing. It is understood that nanocrystals are arranged with a gap hardly provided.

Figure 13B:
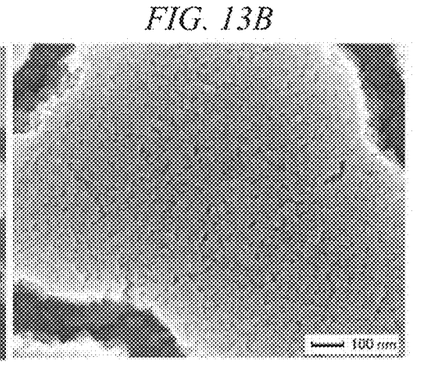
FIG. 13B is a SEM image of the nanocrystal film-coated substrate after firing.

FIG. 13B shows an electron microscopic (SEM) image of a surface of the barium zirconate titanate nanocrystal film-coated substrate after firing. If the SEM image is enlarged, it is understood that nanocrystals are arranged with a gap hardly provided and nanocrystals which are adjacent to each other are bonded.

Regarding the barium zirconate titanate (Zr:Ti=5:95) nanocrystal in Example 4, a barium zirconate titanate nanocrystal film-coated substrate was produced in a manner similar to that in the above descriptions, and then, firing treatment was performed in the same conditions. That is, a nanocrystal film-coated substrate was obtained by performing a method similar to that in a case of Example 1 on the above nanocrystals except that the nanocrystals were obtained in Example 4. Then, firing treatment was performed.

Figure 14A:
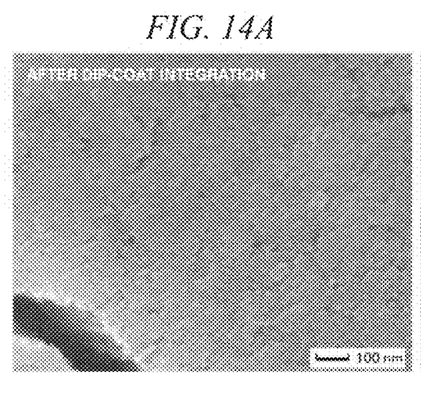
FIG. 14A is a SEM image of a surface of a nanocrystal film-coated substrate of barium zirconate titanate (Zr:Ti=5:95) before firing.

FIG. 14A shows an electron microscopic (SEM) image of a surface of a barium zirconate titanate nanocrystal film-coated substrate produced by using the barium zirconate titanate (Zr:Ti=5:95) nanocrystals in Example 4, before firing. It is understood that nanocrystals are arranged with a gap hardly provided.

Figure 14B:
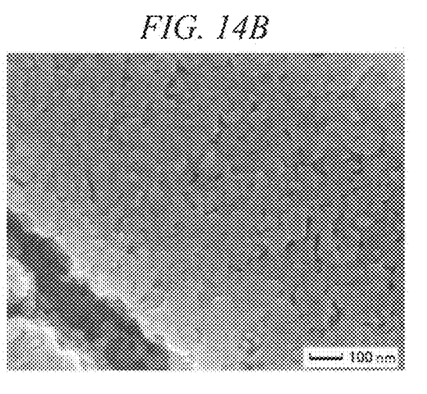
FIG. 14B is a SEM image of the nanocrystal film-coated substrate after firing.

FIG. 14B shows an electron microscopic (SEM) image of a surface of the barium zirconate titanate nanocrystal film-coated substrate after firing. If the SEM image is enlarged, it is understood that nanocrystals are arranged with a gap hardly provided and nanocrystals which are adjacent to each other are bonded.

Figure 15:
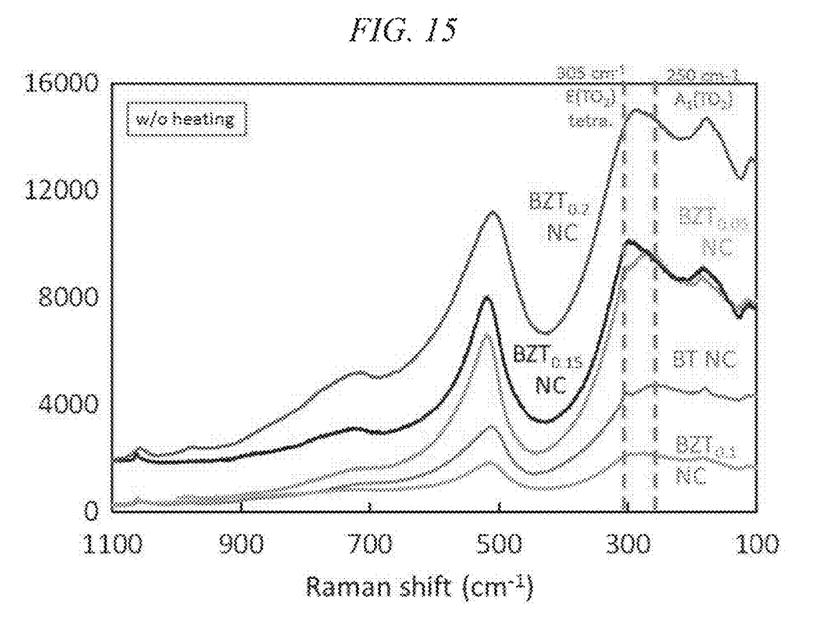
FIG. 15 shows a result obtained by performing Raman spectroscopy measurement on a nanocrystal film-coated substrate after firing.

FIG. 15 shows a result obtained in a manner that regarding a nanocrystal film-coated substrate produced, as described above, by using each of the nanocrystal ($BZT_{0.2}$ in FIG. 15) produced in Example 1, the nanocrystal ($BZT_{0.15}$ in FIG. 15) produced in Example 2, the nanocrystal ($BZT_{0.1}$ in FIG. 15) produced in Example 3, the nanocrystal ($BZT_{0.05}$ in FIG. 15) produced in Example 4, and a barium titanate nanocrystal (Zr:Ti=0:100) (BT in FIG. 15), the firing treatment is performed and then Raman measurement is performed.

The laser Raman spectroscopy device XploRA (manufactured by Horiba Ltd.) was used for Raman measurement.

In the Raman spectrum of $BZT_x$ in FIG. 15, two peaks which are shown at 305 cm$^{-1}$ and 250 cm$^{-1}$ in BT come to be fused to form a single wide peak which is shown at 288 cm$^{-1}$, as the amount (the amount of a solid solution) of Zr is increased. That is, two peaks are changed to be a single peak in a range of x of 0.15 or more.

Figure 16:
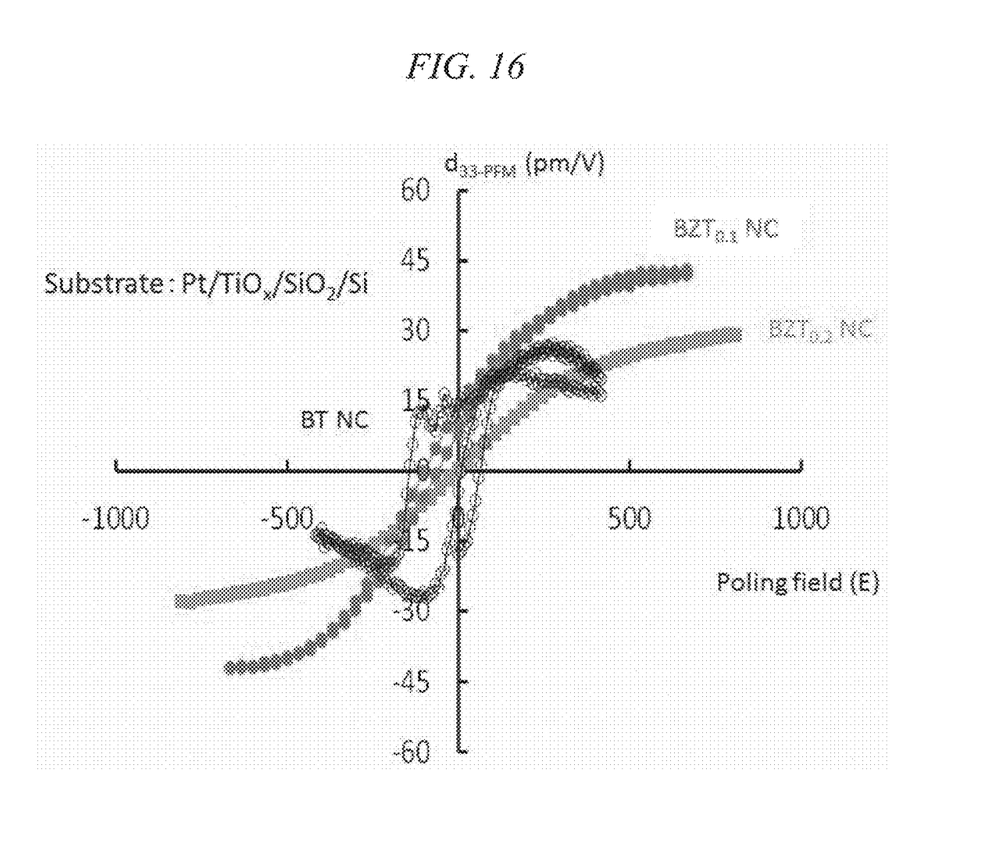
FIG. 16 shows a result obtained by measuring a nanocrystal film-coated substrate with a piezoresponse force microscope.

FIG. 16 shows a result obtained by measuring piezoelectric characteristics after firing treatment on a nanocrystal film-coated substrate produced, as described above, by using each of the nanocrystal ($BZT_{0.2}$ in FIG. 16) produced in Example 1, the nanocrystal ($BZT_{0.1}$ in FIG. 16) produced in Example 3, and a barium titanate nanocrystal (Zr:Ti=0:100) (BT in FIG. 16). Measurement was performed in a piezoresponse force microscopy (PFM) mode of a scanning probe microscopy (SPM). As the device, SPI3800N and SPA400 which were manufactured by SII Nanotechnologies Corporation and has an attached nanonaviS image were used.

The average of absolute values of saturation values of piezoelectric constants $d_{33\text{-}PFM}$ (that is, a value obtained by dividing the sum of absolute values at the right end and the left end in each curve by 2) is 28 pm/V in $BZT_{0.2}$ and is 42 pm/V in $BZT_{0.1}$. Thus, it is understood that the average thereof is equal to or more than 15 pm/V in any case.

Meanwhile, an absolute value of a coercive electric field (intersection of an x axis) is about 17 kV/cm in $BZT_{0.1}$ and is about 1 kV/cm in $BZT_{0.2}$. Thus, it is understood that the absolute value thereof is reduced as the amount (the amount of the solid solution) of Zr is increased.

Self-Arrangement

When nanocrystals are integrated, if a crystal face unique to the crystal is exposed to the surface, crystal faces are two-dimensionally arranged on the surface of a substrate, and this causes the nanocrystals to be most stable. That is, nanocrystals manufactured by the manufacturing method according to the present invention have excellent self-arrangement. For example, close arrangement can be generated only in a manner that, after the obtained nanocrystals are dispersed in toluene, the solution is dropped onto a silicon substrate and then the solvent is removed by drying.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A nanocrystal film-coated substrate comprising:
   a substrate; and
   a nanocrystal film in which barium zirconate titanate nanocrystals are arranged on the substrate, wherein
   an absolute value of a coercive electric field is 0.1 kV/cm or more and less than 142 kV/cm.

2. The nanocrystal film-coated substrate according to claim 1,
   wherein barium zirconate titanate in the barium zirconate titanate nanocrystal is represented by a general formula $Ba(Zr_xTi_{1-x})O_3$ (0<x≤0.5).

3. The nanocrystal film-coated substrate according to claim 1,
   wherein the barium zirconate titanate nanocrystal has a hexahedral shape, and a size of 10 nm to 50 nm.

4. The nanocrystal film-coated substrate according to claim 1, which has at least one peak in a range of 310 cm$^{-1}$ to 240 cm$^{-1}$ in a Raman spectroscopy spectrum.

5. The nanocrystal film-coated substrate according to claim 1,
   wherein an average of absolute values of saturation values of piezoelectric constants $d_{33\text{-}PFM}$ obtained by measurement of a piezoresponse force microscope is 15 pm/V to 200 pm/V.

6. The nanocrystal film-coated substrate according to claim 1,
   wherein heat treatment is performed on the nanocrystal film-coated substrate and thereby forming interface bonding between the barium zirconate titanate nanocrystals.

7. The nanocrystal film-coated substrate according to claim 1,
   wherein the substrate is selected from the group consisting of fluorine doped tin oxide (FTO), indium tin oxide (ITO), glass, silicon, metal, ceramics, polymer, paper and rubber.

8. A manufacturing method of a barium zirconate titanate nanocrystal, comprising:
   mixing a barium hydroxide aqueous solution, an aqueous solution of a water-soluble titanium complex, an aqueous solution of a water-soluble zirconium complex, a sodium hydroxide aqueous solution, an amine compound, and organic carboxylic acid and thereby a solution is obtained, and heating the solution and thereby performing synthesis.

9. The manufacturing method of a barium zirconate titanate nanocrystal according to claim 8,
   wherein a ligand of the water-soluble titanium complex is hydroxycarboxylic acid.

10. The manufacturing method of a barium zirconate titanate nanocrystal according to claim 8,
    wherein a ligand of the water-soluble zirconium complex is hydroxycarboxylic acid.

11. The manufacturing method of a barium zirconate titanate nanocrystal according to claim 8,
    wherein the amine compound is tert-butylamine, and the organic carboxylic acid is oleic acid.

12. The manufacturing method of a barium zirconate titanate nanocrystal according to claim 8,
    wherein concentration of sodium hydroxide in the solution is 1 mol/L to 2 mol/L.

13. The manufacturing method of a barium zirconate titanate nanocrystal according to claim 8,
    wherein a molar ratio of titanium/zirconium in the solution is 0.01:0.99 to 0.99:0.01.

14. The manufacturing method of a barium zirconate titanate nanocrystal according to claim 8, wherein, in the solution, the number of moles of the amine compound with respect to 1 mol of barium is 2 to 16, and the number of moles of the organic carboxylic acid with respect to 1 mol of barium is 2 to 16.

15. The manufacturing method of a barium zirconate titanate nanocrystal according to claim 8,
wherein the heating is performed at a temperature of 150° C. to 240° C. for a period of one hour to 120 hours.

16. The manufacturing method of a barium zirconate titanate nanocrystal according to claim 8,
wherein, after the synthesis, centrifugation of the solution is performed and thereby a barium zirconate titanate nanocrystal is collected.

17. A manufacturing method of a nanocrystal film-coated substrate, comprising:
a process of dispersing barium zirconate titanate nanocrystals manufactured by using the manufacturing method of a barium zirconate titanate nanocrystal according to claim 9, in a nonpolar solvent;
a process of performing centrifugation of a nanocrystal dispersion liquid and collecting a supernatant and thereby obtaining a nanocrystal dispersion liquid; and
a process of immersing a substrate into the nanocrystal dispersion liquid, and pulling the substrate up from the nanocrystal dispersion liquid and thereby arranging barium zirconate titanate nanocrystals on the substrate.

* * * * *